Dec. 25, 1923.
J. LONG ET AL
1,478,831
FARM WAGON
Filed Oct. 24, 1922    3 Sheets-Sheet 1
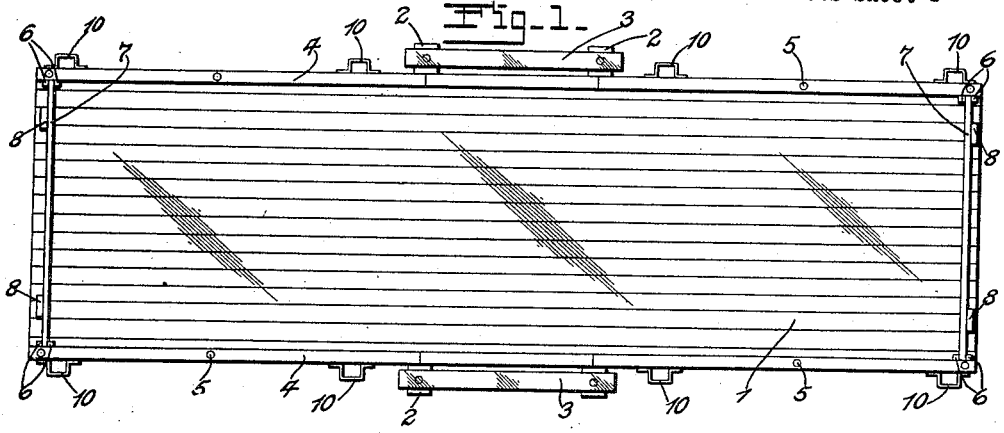
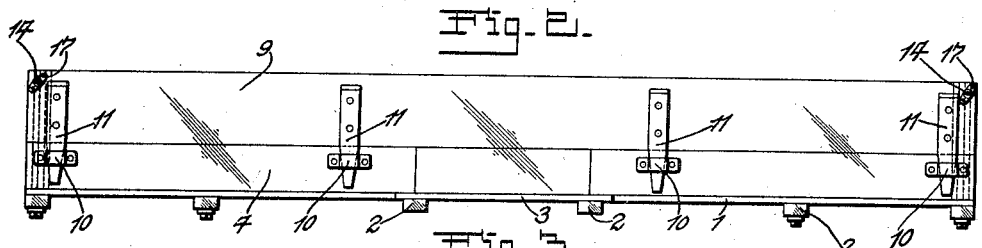
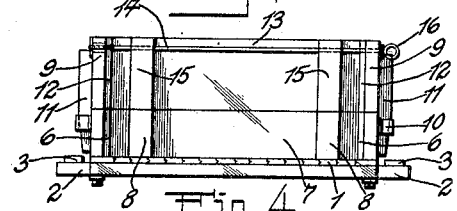
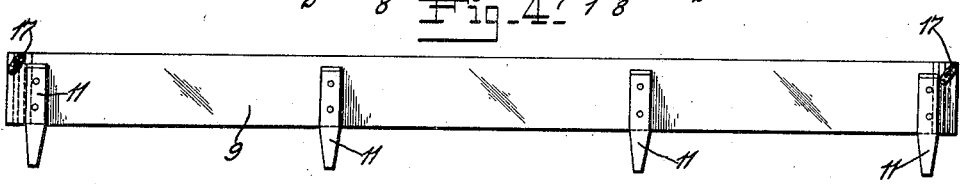
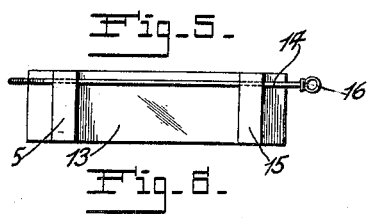
Inventors.
John Long,
Andrew J. Bass,
Their Attorneys

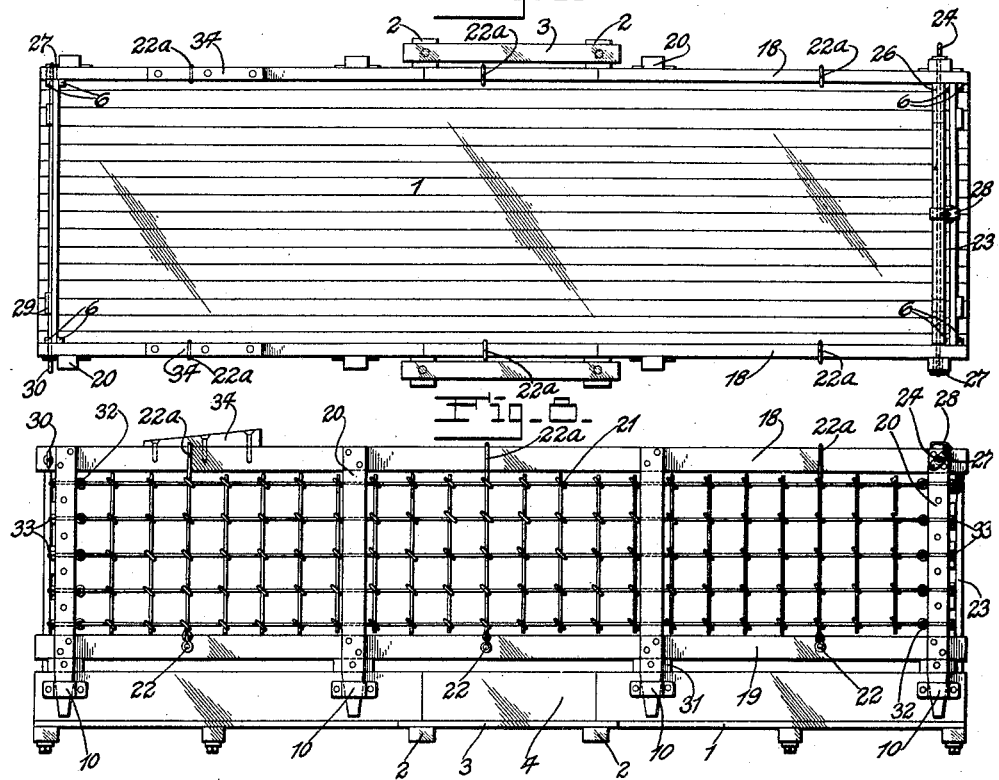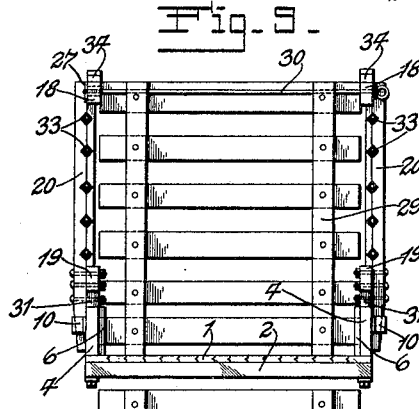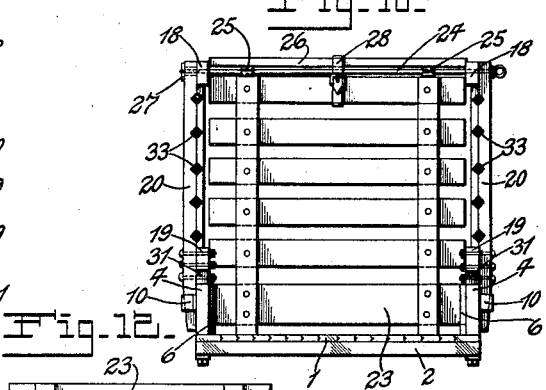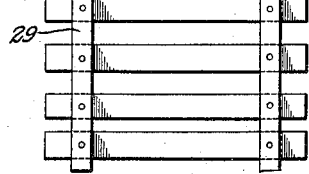

Dec. 25, 1923.
J. LONG ET AL
1,478,831
FARM WAGON
Filed Oct. 24, 1922   3 Sheets-Sheet 3
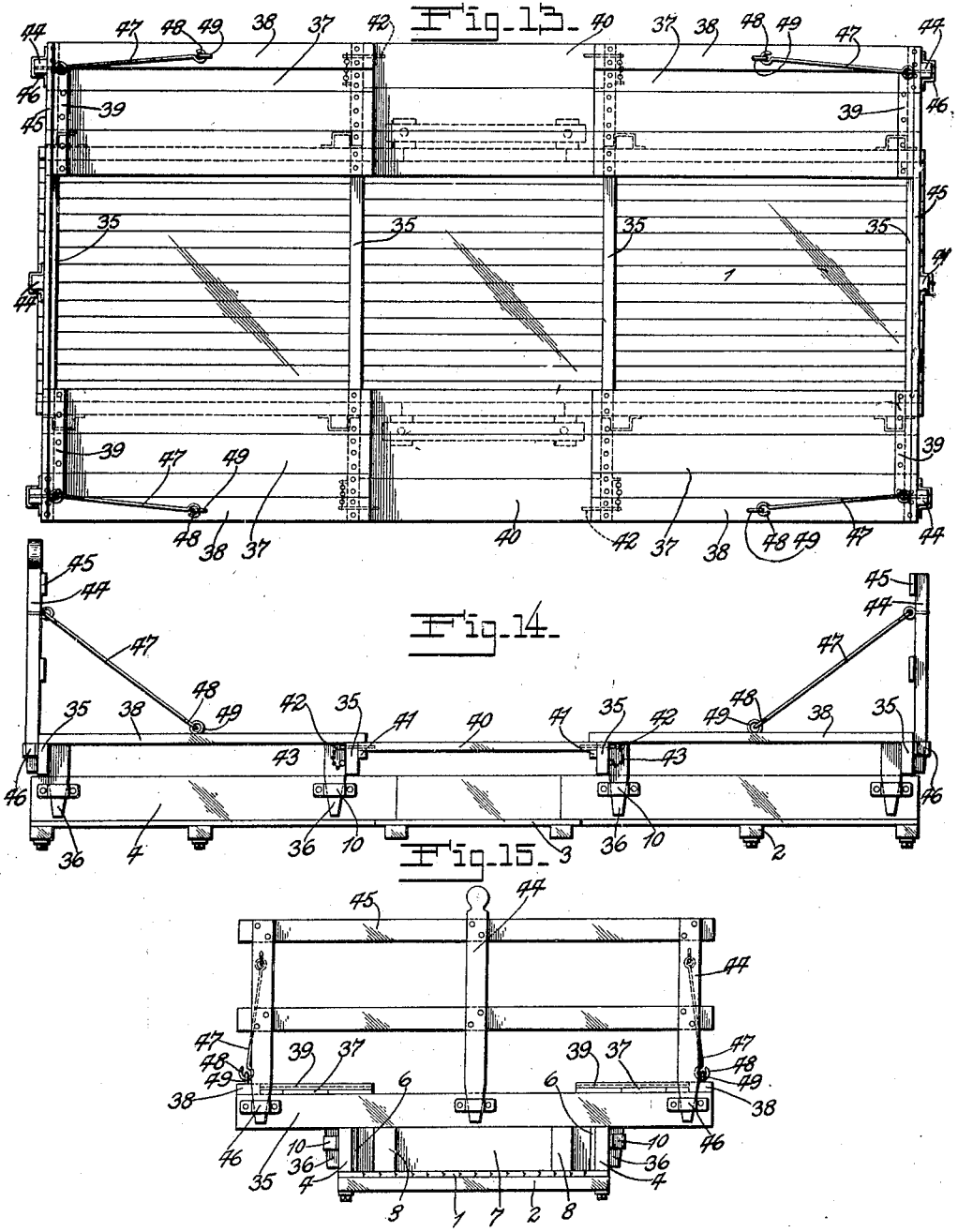
Inventors.
John Long,
Andrew J. Bass,
Their Attorneys.

Patented Dec. 25, 1923.

1,478,831

UNITED STATES PATENT OFFICE.

JOHN LONG, OF JEFFERSON CITY, AND ANDREW J. BASS, OF COLUMBIA, MISSOURI.

FARM WAGON.

Application filed October 24, 1922. Serial No. 596,554.

*To all whom it may concern:*

Be it known that we, JOHN LONG, of Jefferson City, Cole County, Missouri, and ANDREW J. BASS, of Columbia, Boone County, Missouri, both citizens of the United States, have invented a new and useful Farm Wagon, of which the following is a specification.

This invention relates to farm wagons of the type that may be easily converted from one purpose to another.

An object of the invention is to provide an improved farm wagon including a wagon bed or body adapted for use in the hauling of grain and the like, and constructed and equipped so that it may be easily applied to use as a portion of a crate or pen for the hauling of farm animals.

Another object of the invention is to provide an improved wagon bed or body constructed and designed to support a hay frame.

Another object of the invention is to provide an improved farm vehicle including a wagon bed or body adapted for use in hauling shelled grain and the like, and an improved sectional hay frame for use in connection with the wagon bed or body and constructed so that the shelled seed or grain will be retained thereby until discharged into the bed or body of the wagon.

Another object of the invention is to provide an improved crate or pen for use in connection with the bed or body of the wagon.

Other objects will appear from the following description, reference being made to the drawings, in which Fig. 1 is a plan view of our improved wagon bed or body.

Fig. 2 is a side elevation showing the removable side boards in position.

Fig. 3 is an end elevation.

Fig. 4 is a view showing one of the removable side boards detached.

Fig. 5 is an elevation of one of the upper end gates or boards.

Fig. 6 is an elevation of one of the lower end gates or boards.

Fig. 7 is a plan view showing our improved animal crate or pen upon the wagon body or bed.

Fig. 8 is a side elevation.

Fig. 9 is a front end elevation.

Fig. 10 is a rear end elevation.

Fig. 11 is a view showing the front end of the crate removed.

Fig. 12 is a view showing the rear end crate removed.

Fig. 13 is a plan view of our improved hay frame upon the wagon bed or body.

Fig. 14 is a side elevation.

Fig. 15 is an end elevation.

As shown the bed or body comprises a floor 1 composed of flooring timber attached to the strong cross pieces 2. A sufficient number of cross pieces 2 are used to afford the necessary strength and rigidity in order to provide a floor for the bed or body of the wagon of sufficient strength. Thus the same floor is designed and adapted for use in hauling animals, such as hogs, sheep or calves, and is also designed and adapted for use as the floor of the wagon bed or body used in hauling grain and for use as the bottom of a hay frame. A pair of the cross pieces 2, near the middle of the body, extend beyond the sides thereof and support step pieces 3 on their outer ends. Side wall members 4 are attached to the longitudinal sides of the floor by bolts 5 (Fig. 1) or other equivalent fasteners. The side walls 4 extend the full length of the floor and have spaced cleats 6 on their inner sides near each end forming retainers for removable end gates or boards 7. The end gates or boards 7 are slipped downwardly between the cleats 6 from the upper ends of said cleats until the lower edges of the end boards or gates rest upon the floor 1 of the wagon body. To prevent warping the end gates or boards 7 are strengthened by vertical strips 8 attached thereto near the ends.

For use in hauling grain or the like removable side boards 9 are provided to rest upon the side walls 4 throughout the length thereof, so as to increase the capacity of the wagon bed or body. The lower side walls 4 are provided at intervals on their outer sides with brackets 10 which receive the lower ends of downwardly extended standards 11 attached to the side boards 9. The opposite ends of the side boards 9 have cleats 12 in vertical alinement with the cleats 6 and constituting retainers for the upper end boards or gates 13. At each end a rod 14 is passed through one of the side boards 9 and through the reinforcing strips 15 on the end gates 13, and has a head or loop 16 on one end and the opposite end threaded and screwed into a socket 17 on the other side board 9.

Our invention comprises structure for use in connection with the lower portion of the body or bed when the upper side boards and upper end gates are removed, to form a crate or pen for hauling live stock such as hogs, sheep and calves, or poultry. As shown, there are two side members for forming the side walls of a crate above the lower side walls 4, each of the side members being in the form of a frame. The frame comprises an upper member 18, a lower frame member 19 and a number of vertical frame members 20 adapted to engage in the sockets 10 to hold the side walls of the crate in position. Woven wire fencing 21 secured to the vertical frame members 20 forms a confining wall or fence to confine the live stock or poultry. If desired, the woven wire fence may be connected to the lower frame members 19 at points between the upright frame members 20, as shown at 22, and additionally strengthened by looping some of the vertical wires around the upper frame members 18 as shown at 22ª. The rear end gate for the crate is shown in Figs. 10 and 11, the same including a transverse lower member 23 for engagement between the cleats 6 of the wagon bed or body, and a lattice work upper structure extending nearly to the height of the side walls of the crate between the rear ends thereof. A rod 24 of the same construction as the rod 14 is passed through a hole in one of the side walls of the crate and through brackets 25 on the under side of a transverse member 26 and has one end screwed into a socket 27 on the other side wall of the crate. The end wall of the crate may be attached to the cross piece 26 by a strap 28.

The front end 29 of the crate likewise engages the cleats 6 and has its upper end held in place by a rod 30 (Fig. 9) passing through the side walls of the crate and through the upright members of the end wall.

In the embodiment shown blocks 31 (Fig. 8) attached to the uprights 20 rest upon the upper edges of the side boards 4 and support the sides of the crate at proper height.

An important feature of the invention resides in the means for holding the woven wire 21 under tension. As shown, the ends of the horizontal strands of the wire are secured to the inner ends of bolts 32 which pass through the end uprights 20 and have nuts 33 screwed on their outer ends and affording means for tightening and tensioning the wires.

Supports 34 for a seat may be secured to the upper horizontal members 18 near their forward ends.

The hay frame adapted for use in connection with the wagon bed or body is shown in Figs. 13 to 15. The frame is sectional, each section being in the form of a frame, and the different frame sections may be readily mounted in position on the wagon bed and removed therefrom. The front frame section and the rear frame section are substantial duplicates, each comprising a pair of cross pieces 35 adapted to rest edgewise upon the upper edges of the side walls 4 of the wagon bed. The cross pieces extend a considerable distance beyond each side of the wagon bed and have stakes 36 rigid therewith for engagement within the brackets 10. The ends of the cross pieces 35 support flooring 37 which, at each side, extends inwardly beyond the sides 4 of the wagon bed so that the loose grain will be caught by the floor 37 and discharged into the wagon bed. To prevent the grain from dropping off the outer edges of the flooring 37 a raised strip 38 is provided, and similar raised strips 39 are provided along the front edges of the flooring of the front section of the frame and along the rear edges of the flooring of the rear section of the frame.

Flooring sections 40 to complete the hay frame are provided to fill the spaces at the sides and to catch the loose grain. The sections 40 are arranged to slide upon supports 41 attached to the sides of the cross pieces 35 as will be readily understood by reference to Fig. 14. The sections 40 may be secured in position by bolts or rods 42 passing through the cross pieces 35 and into holes or recesses in the edges of the sections 40. The sections 40 and their associated parts constitute releasable connections uniting the front and rear frame sections. Obviously any appropriate fastening device may be used and we do not restrict ourselves in such unessential particulars. As shown, the bolts or rods 42 are supported by chains 43 attached to the cross pieces 35 so that they will not become lost or misplaced.

The front end of the frame comprises vertical stakes 44 and cross pieces 45, the stakes being designed and adapted to engage in brackets 46 on the front cross piece 35. Rods 47 are pivoted to the two side stakes 44 and have hooks 48 on their free ends for engagement in eyes 49 attached to the flooring 37 near the side edges.

The rear part of the frame is similarly constructed and similar reference characters are applied thereto.

The bed remains on the wagon for all purposes, whether the hay rack, or the live stock crate, or the upper side boards are used, thereby saving much labor when it is desired to change from one use to another. One person alone can apply and remove any or all of the devices without trouble, which cannot be done in the case of large unitary racks or crates. Only small space is required to store the sections when not in use.

From the foregoing it will be seen that our invention is a highly satisfactory one for farm service, where it is desirable to use a wagon for various purposes. The wagon bed or body constitutes the base upon and around which the invention is constructed and the provision of means, whereby the wagon bed may be utilized for the various purposes to which our invention permits it to be applied, meets an actual and existing need. The crate for use in hauling live stock and poultry is composed of strong material and yet is of such light weight that it may be easily placed on or removed from the wagon bed by a single person. So, also, in the case of the hay rack or frame, the different sections thereof being strong enough for the purposes for which they are intended and light enough as to weight so that a single person may easily place the hay frame on the wagon bed or remove it. Our invention is characterized by these and various other advantages, all of which will be apparent to those familiar with such devices.

We are aware that the invention may be varied within equivalent limits without departure from the nature and principle thereof. We do not restrict ourselves unessentially, but what we claim and desire to secure by Letters Patent is:—

1. In a farm wagon, the combination with a body having side and end walls, of a pair of frames supported transversely of the body, releasable connections uniting said frames, means for holding said frames in position on the body, and a pair of upright end frames one of which is removably supported at the rear end of one of said transverse frames and the other of which is removably supported at the front end of the other one of said transverse frames.

2. A farm wagon, comprising a body, a pair of transverse frames resting on the body extending beyond the side edges thereof, means for holding said frames relatively stationary, a pair of upright end frames one of which is removably supported at the rear end of one of said transverse frames and the other of which is removably supported at the front end of the other one of said transverse frames, and releasable connections from points near the upper edges of said upright frames to points on said transverse frames forwardly from the rear end of said rear frame and rearwardly from the front of said front frame respectively.

3. An improved hay frame for wagons comprising a pair of separate transverse frames, flooring extending inwardly from each side edge of both of said frames, a pair of separate floor sections removably supported between said frames, and a pair of upright end frames one of which is removably supported at the rear end of one of said transverse frames and the other of which is removably supported at the front end of the other one of said transverse frames.

4. An improved hay frame for wagons, comprising a pair of separate transverse frames, flooring extending inwardly from each side edge of both of said frames, means for supporting said frames relatively stationary, a pair of separate floor sections removably supported between said frames, and releasable means for holding said floor sections in position between said frames.

5. A farm wagon, comprising a body, brackets in connection with the sides of the body, a pair of transverse frames resting on the body and extending laterally beyond the side edges thereof, stakes in connection with said frames relatively a considerable distance inwardly from the side edges thereof engaging in said brackets, and a pair of upright end frames one of which is removably supported at the rear end of one of said transverse frames and the other of which is supported at the front end of the other one of said transverse frames.

6. A farm wagon, comprising a body, brackets in connection with the sides of the body, a pair of transverse frames resting on the body and extending laterally beyond the side edges thereof, stakes in connection with said frames relatively a considerable distance inwardly from the side edges thereof engaging in said brackets, a pair of upright end frames one of which is removably supported at the rear end of one of said transverse frames and the other of which is supported at the front end of the other one of said transverse frames, and removable slides supported between said end frames and extending laterally beyond the side edges of said body and having their inner edges over said body.

7. An improved hay frame for wagons, comprising a pair of separate frames, flooring extending inwardly from each side of both of said frames, a pair of separate floor sections, and means for removably supporting the separate floor sections between said frames.

8. In a wagon, the combination with a body having side and end walls, of a pair of frames supported transversely of the body one at each end, means for holding said frames in position on the body, flooring extending inwardly from the lateral edges of each of said frames to points above the body, and removable flooring sections supported between said frames and extending inwardly to points above the body.

9. In a wagon, the combination with a body having side and end walls, of a pair of frames supported transversely of the body one at each end, means for holding said frames in position on the body, flooring extending inwardly from the lateral edges of each of said frames to points above the body, removable flooring sections supported between said frames and extending inwardly to points above the body, and removable end frames supported above the ends of the body by said first-named frames.

JOHN LONG.
ANDREW J. BASS.